(12) United States Patent
Wada et al.

(10) Patent No.: US 12,030,309 B2
(45) Date of Patent: Jul. 9, 2024

(54) PRINTING APPARATUS, CARRIAGE APPARATUS, AND CONTROL METHOD

(71) Applicant: CANON KABUSHIKI KAISHA, Tokyo (JP)

(72) Inventors: Naoaki Wada, Kanagawa (JP); Daigo Kuronuma, Kanagawa (JP); Masakazu Nagashima, Kanagawa (JP); Tomohito Abe, Kanagawa (JP); Ryohei Maruyama, Kanagawa (JP); Kenta Iimura, Kanagawa (JP); Hiromasa Yoneyama, Kanagawa (JP); Kichinosuke Hirokawa, Tokyo (JP); Akira Fujikake, Kanagawa (JP); Toshiaki Yamaguchi, Tokyo (JP); Hideyuki Nozawa, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 7 days.

(21) Appl. No.: 17/742,545

(22) Filed: May 12, 2022

(65) Prior Publication Data

US 2022/0363079 A1    Nov. 17, 2022

(30) Foreign Application Priority Data

May 14, 2021  (JP) ................ 2021-082601

(51) Int. Cl.
*B41J 29/38*    (2006.01)
*B41J 19/00*    (2006.01)
*B41J 19/20*    (2006.01)

(52) U.S. Cl.
CPC ........... *B41J 19/202* (2013.01); *B41J 19/005* (2013.01); *B41J 29/38* (2013.01)

(58) Field of Classification Search
CPC ...... B41J 19/202; B41J 19/005; B41J 29/393; B41J 29/38
See application file for complete search history.

(56) References Cited

U.S. PATENT DOCUMENTS

| | | | |
|---|---|---|---|
| 2003/0206212 A1* | 11/2003 | Mitarai | ................. B41J 19/202 347/37 |
| 2022/0097427 A1 | 3/2022 | Abe et al. | |
| 2022/0097429 A1 | 3/2022 | Takahashi et al. | |

FOREIGN PATENT DOCUMENTS

| | | |
|---|---|---|
| JP | 3604994 B2 | 12/2004 |
| JP | 2011-176901 A | 9/2011 |

OTHER PUBLICATIONS

Ryohei Maruyama Daigo Kuronuma Masakazu Nagashima Tomohito Abe Kenta Imura Hiromasa, U.S. Appl. No. 17/742,524, filed May 12, 2022.

(Continued)

*Primary Examiner* — Julian D Huffman
(74) *Attorney, Agent, or Firm* — Venable LLP

(57) ABSTRACT

A printing apparatus includes a carriage mounted with a printing unit configured to perform printing on a print medium, a first motor used to move the carriage, a second motor used together with the first motor to move the carriage, and a control unit configured to control the first motor and the second motor. When moving the carriage, the control unit controls the first motor with a first control amount and controls the second motor with a second control amount. The first control amount and the second control amount are different from each other, and a ratio therebetween is a predetermined ratio.

11 Claims, 13 Drawing Sheets

(56) References Cited

OTHER PUBLICATIONS

U.S. Appl. No. 17/742,534, Tomohito Abe Kenta Iimura Kichinosuke Hirokawa Akira Fujikake Toshiaki Yamaguchi Daigo Kuronuma Masakazu Nagashima Naoaki Wada Ryohei Maruyama Hideyuki Nozawa, filed May 12, 2022.

* cited by examiner

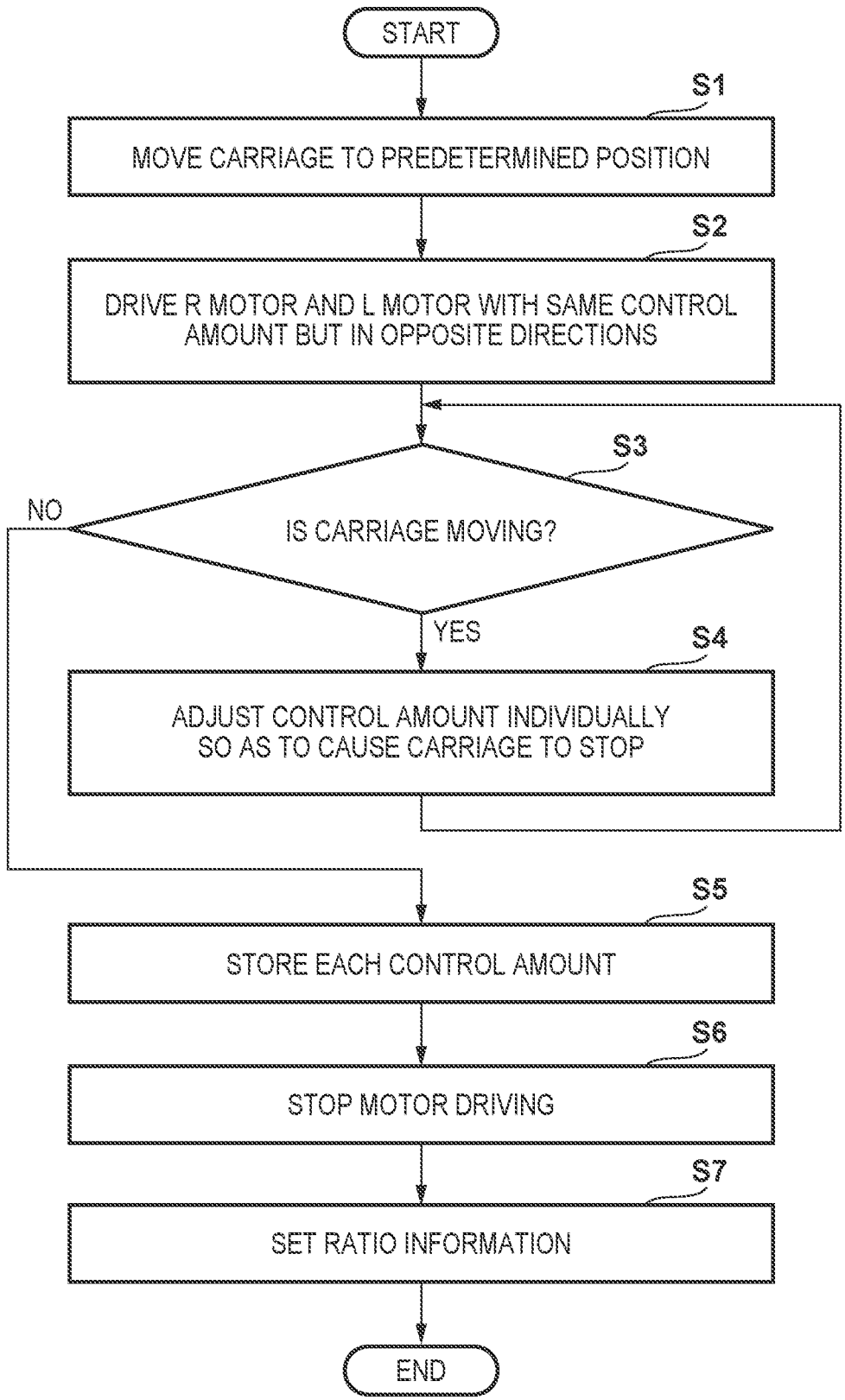

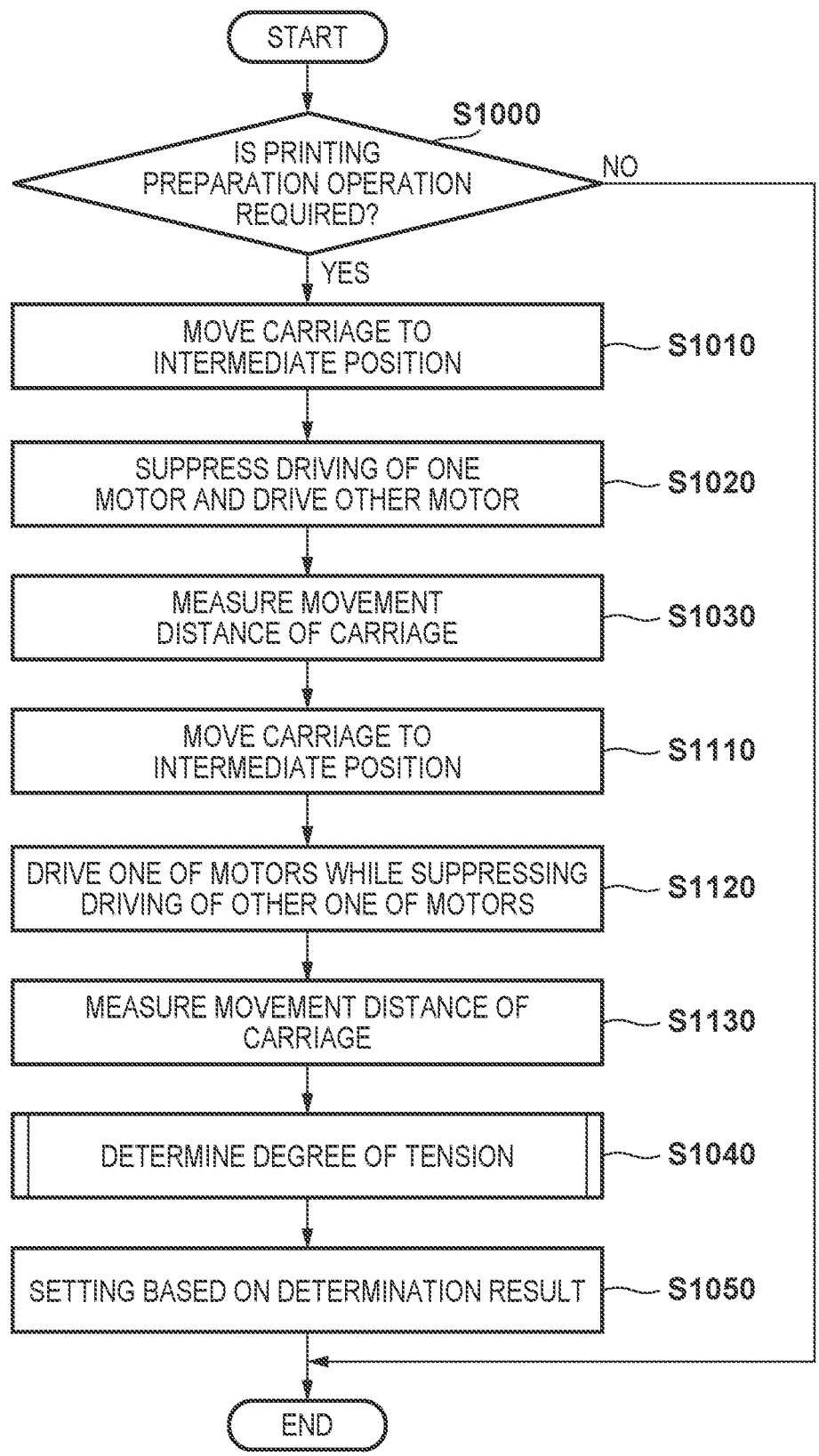

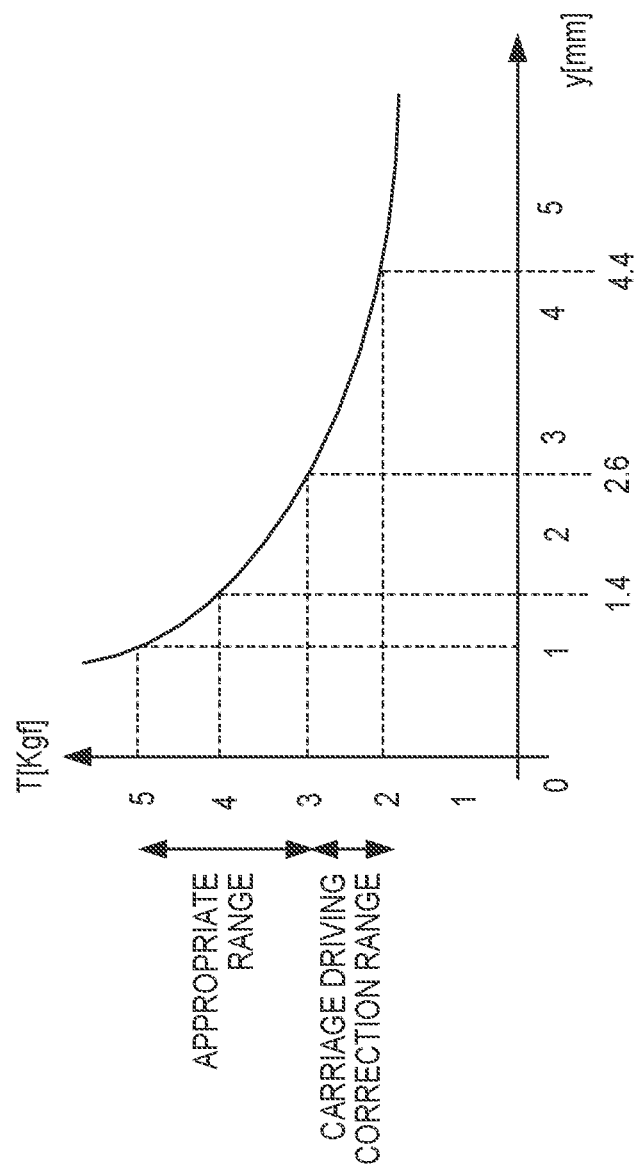

PRINTING APPARATUS, CARRIAGE APPARATUS, AND CONTROL METHOD

BACKGROUND OF THE INVENTION

Field of the Invention

The present invention relates to a printing apparatus.

Description of the Related Art

There is known a printing apparatus that performs printing on a print medium such as paper by discharging ink from a printhead while moving a carriage mounted with the printhead. With such a printing apparatus, demands for improving the productivity and the image quality of printing are increasing in recent years. Therefore, while the weight of the printhead increases due to the tendency of the printhead to become longer and have a higher density, the carriage is demanded to move with a high velocity and improve the positional accuracy.

As a driving method of the carriage, a method is known in which the carriage is connected to an endless belt (timing belt) and the carriage is moved by causing the belt to travel by a driving force of a motor. It is conceivable to employ a large high-output motor to increase the moving velocity of the carriage, but the market distribution scale of large high-output motors is small and the cost thereof is high. Japanese Patent No. 3604994 discloses an apparatus in which one of two pulleys for causing the endless belt to travel is rotated by a stepper motor and the other one is rotated by a DC motor.

In a method in which a plurality of motors are used as driving sources of a mechanism for moving a carriage, the carriage can be moved at a higher velocity and the printing efficiency can be improved. However, if an output difference between the motors caused by an individual difference between the motors or the degree of deterioration thereof is large, the movement of the carriage may become unstable and the printing quality may be degraded.

SUMMARY OF THE INVENTION

The present invention provides a technique of moving a carriage more stably.

According to one aspect of the present invention, there is provided a printing apparatus comprising: a carriage mounted with a printing unit configured to perform printing on a print medium; a first motor used to move the carriage; a second motor used together with the first motor to move the carriage; and a control unit configured to control the first motor and the second motor, wherein when moving the carriage, the control unit controls the first motor with a first control amount and controls the second motor with a second control amount, and the first control amount and the second control amount are different from each other, and a ratio therebetween is a predetermined ratio.

Further features of the present invention will become apparent from the following description of exemplary embodiments (with reference to the attached drawings).

BRIEF DESCRIPTION OF THE DRAWINGS

FIG. 6 is a flowchart showing an example of ratio information setting processing;

FIG. 12 is a flowchart showing another example of the method of determining the degree of tension of the timing belt; and FIG. 13 is a graph showing an example of a method of determining the degree of tension of a belt member.

DESCRIPTION OF THE EMBODIMENTS

Figure 1:
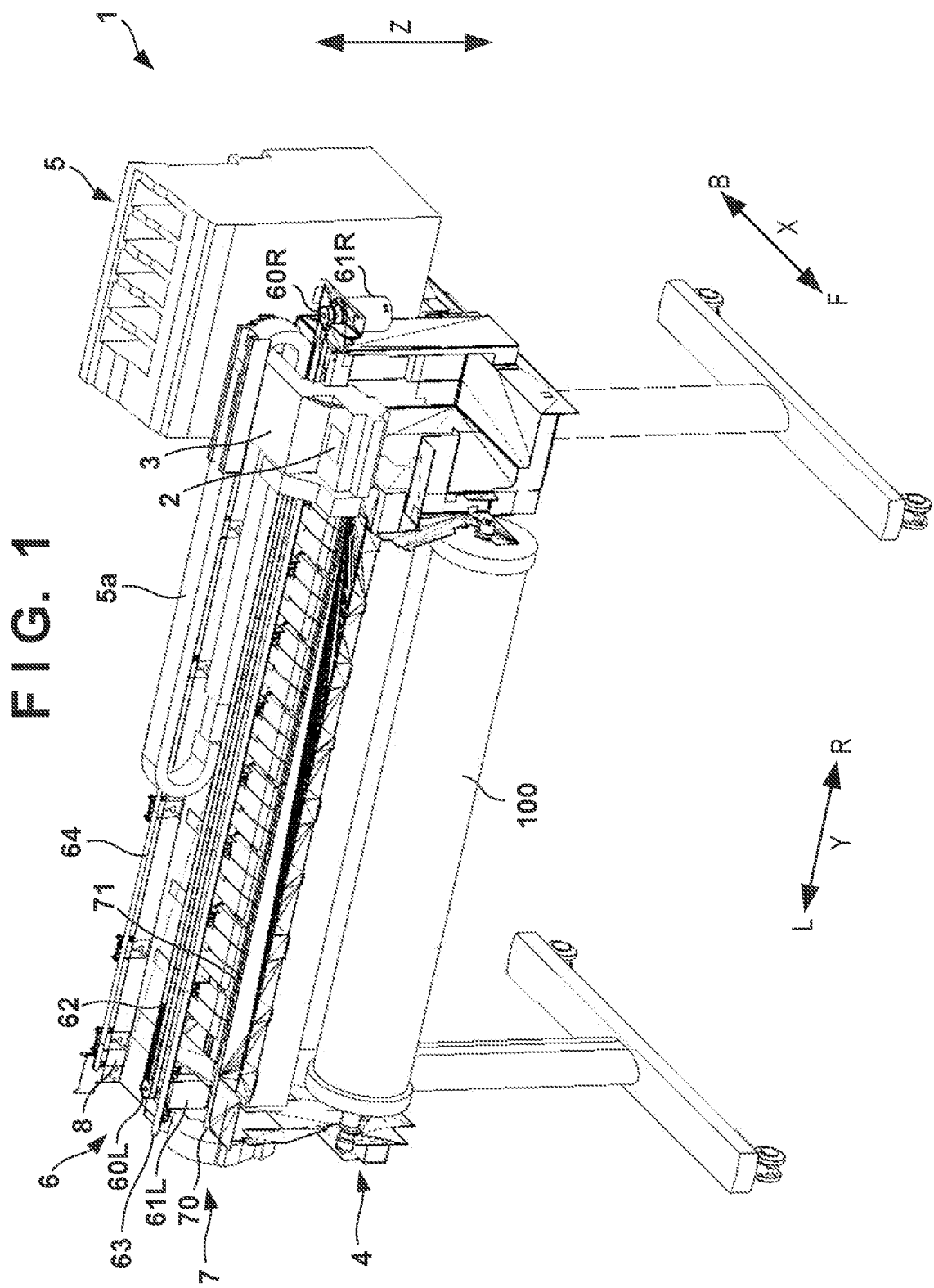
FIG. 1 is a perspective view of a printing apparatus according to an embodiment of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Outline of Printing Apparatus

Figure 2:
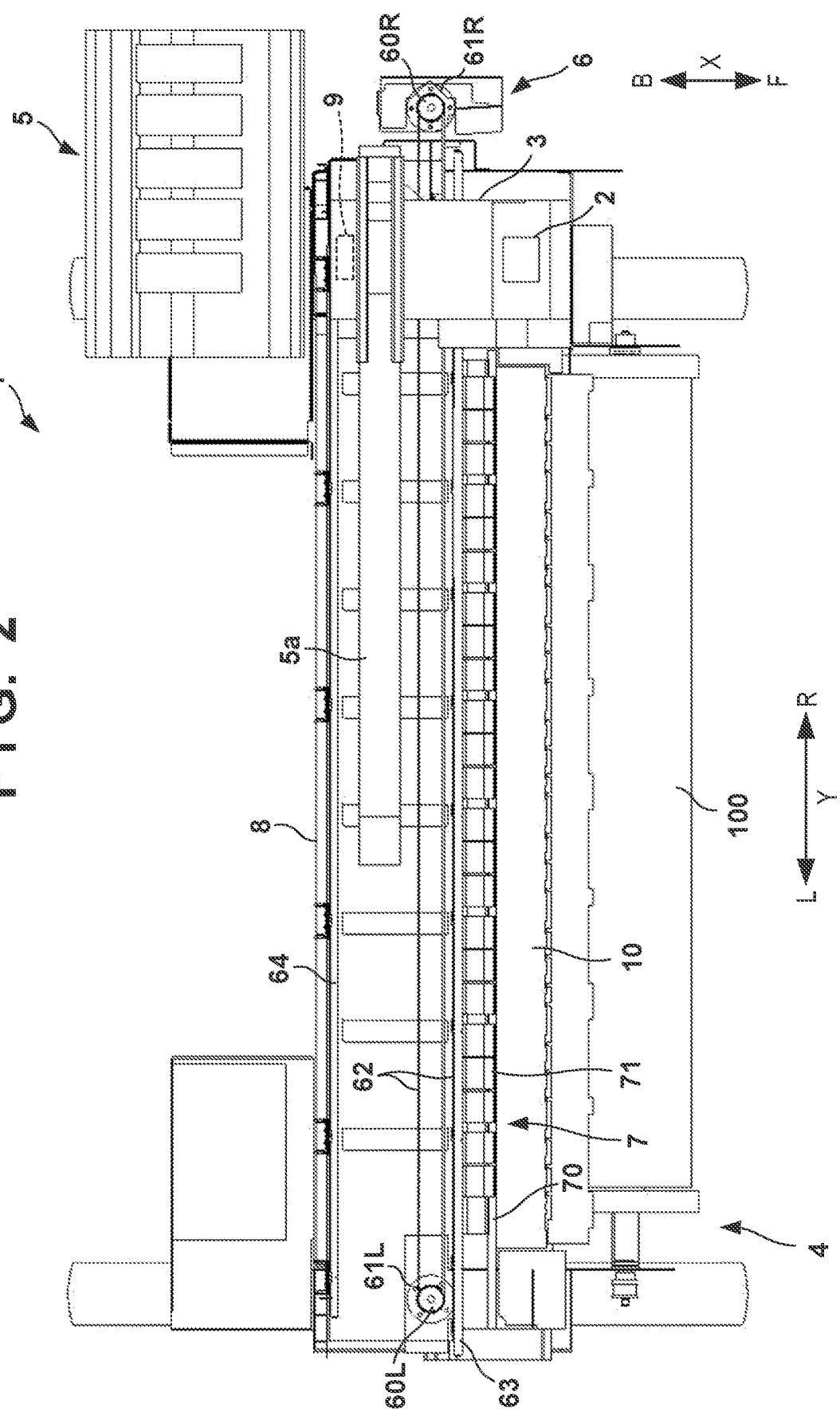
FIG. 2 is a plan view of the printing apparatus shown in FIG. 1.

FIG. 1 is a perspective view of a printing apparatus 1 in this embodiment, and FIG. 2 is a plan view of the printing apparatus 1. In the drawings, an arrow Y indicates the widthwise direction (left-and-right direction) of the printing apparatus 1, L indicates the left side, and R indicates the right side. An arrow X indicates the depth direction (front-and-rear direction) of the printing apparatus 1, F indicates the front side, and B indicates the rear side. An arrow Z indicates the vertical direction. In this embodiment, a case will be described in which the present invention is applied to a serial inkjet printing apparatus that performs printing by discharging ink to a print medium. However, the present invention is also applicable to a printing apparatus of another form.

Note that "printing" includes not only forming significant information such as characters and graphics but also forming images, figures, patterns, and the like on print media in a broad sense, or processing print media, regardless of whether the information formed is significant or insignificant or whether the information formed is visualized so that a human can visually perceive it. In addition, although in this embodiment, sheet-like paper is assumed as a "print medium" serving as a print target, sheet-like cloth, a plastic film, and the like may be used as print media.

The printing apparatus 1 includes a feeding unit 4. The feeding unit 4 holds a print media to be fed into the printing apparatus 1. In this embodiment, a roll sheet 100 is used as the print medium. However, the print medium may be a cut sheet. The roll sheet 100 is obtained by winding a sheet into a roll form around a cylindrical core. The roll sheet 100 has, for example, a width of 10 to 60 inches in the X direction.

The printing apparatus 1 includes a conveying unit 7. The conveying unit 7 is a sheet conveying mechanism that includes a conveying roller 70 and a pinch roller 71 pressed against the conveying roller 70. The sheet pulled out from the roll sheet 100 is fed to the rear side in the X direction. Then, the sheet is folded to the front side and reaches the conveying unit 7. The sheet is then nipped between the conveying roller 70 and the pinch roller 71 of the conveying unit 7 and conveyed on a platen 10 to the front side in the X direction.

The printing apparatus 1 includes a printhead 2 that prints an image by discharging ink to the sheet conveyed on the platen 10 by the conveying unit 7. The printhead 2 includes a plurality of nozzles which discharge ink. An energy element that generates energy for discharging ink by supply of power is arranged in each nozzle. The energy element is, for example, an electrothermal transducer such as a heater or a piezoelectric transducer such as a piezoelectric element. The printhead 2 can discharge different kinds of ink (for example, ink of a plurality of colors such as black (K), cyan (C), magenta (M), and yellow (Y)), and multiple nozzles are formed for each kind of ink.

Ink is supplied to the printhead 2 from an ink container 5. The ink container 5 includes a tank for each kind of ink, and ink is stored in the tank. Ink is supplied from the ink container 5 to the printhead 2 via a flexible tube (not shown) supported by a chain link 5a.

The printhead 2 is mounted on a carriage 3, and the printing apparatus 1 includes a carriage apparatus described below. The carriage 3 is moved by a driving unit 6 in the Y direction. The driving unit 6 includes guide rails 63 and 64 extended parallel to the Y direction. The carriage 3 engages with the guide rails 63 and 64 so as to be guided in movement in the Y direction. The driving unit 6 includes pulleys 60R and 60L as an example of a plurality of rotation members. The pulleys 60R and 60L are spaced apart from each other in the Y direction and have the same specifications (outer diameter, weight, and the like). A timing belt 62, which is an example of an endless belt, is wound around the pulleys 60R and 60L. The carriage 3 is connected to the timing belt 62.

The driving unit 6 includes carriage motors 61R and 61L. The carriage motor 61R is a driving source for rotating the pulley 60R, and the carriage motor 61L is a driving source for rotating the pulley 60L. In this embodiment, the carriage motor 61R is configured to directly rotate the pulley 60R while the pulley 60R is connected to the output shaft of the carriage motor 61R. However, the carriage motor 61R may be configured to rotate the pulley 60R via a decelerator. Similarly, the carriage motor 61L is configured to directly rotate the pulley 60L while the pulley 60L is connected to the output shaft of the carriage motor 61L. However, the carriage motor 61L may be configured to rotate the pulley 60L via a decelerator. Each of the carriage motors 61R and 61L is, for example, a brushless DC motor and, in this embodiment, the carriage motors 61R and 61L are the same product. Accordingly, the carriage motors 61R and 61L have the same performance and characteristics during driving.

The carriage 3 can be moved by driving one or both of the carriage motors 61R and 61L to cause the timing belt 62 to travel. Further, by switching the rotation directions of the carriage motors 61R and 61L, the carriage 3 can be reciprocated in the Y direction. In this embodiment, it is possible to move the carriage 3 by outputs of two carriage motors 61R and 61L, so that the higher output can be obtained than in a case of driving by one carriage motor. Therefore, even if the carriage 3 is heavy, it can be moved at a higher velocity.

An encoder sensor 9 is mounted on the carriage 3. The encoder sensor 9 reads a linear scale (encoder scale) 8 extended in the Y direction and outputs a signal indicating the Y-direction position of the carriage 3. The linear scale 8 includes, for example, transmissive portions and light shielding portions repeatedly formed at predetermined constant intervals in the Y direction. The encoder sensor 9 is, for example, an optical sensor which includes a light emitting unit and a light receiving unit. The encoder sensor 9 outputs, as a detection signal, a light-receiving result of the light receiving unit which changes depending on whether light is received from the transmissive portion or the light shielding portion.

When the carriage 3 moves in the Y direction, the encoder sensor 9 can obtain a pulsed signal. By counting the number of pulses, the Y-direction position of the carriage 3 can be calculated. Further, the moving velocity of the carriage 3 can be calculated from the number of pulses per unit time. For example, assume that the transmissive portion and the light shielding portion of the linear scale 8 are repeated in 150 cycles per inch. Each time the carriage moves 1/150 inch, the encoder sensor 9 obtains a one-pulse signal. If three pulses are counted in a time of 500 µs, the velocity v of the carriage 3 can be calculated as v=(3/150 inch)/500 µs=40 ips.

In a printing operation, the sheet is intermittently conveyed by the conveying unit 7 (stepped conveyance). While the conveyance of the sheet is stopped, the carriage 3 is moved in the main scanning direction (Y direction) and ink is discharged from the printhead 2 onto the sheet (printing scan). When printing for one scan ends, the conveying unit 7 conveys the sheet by a predetermined amount in the subscannig direction (a direction orthogonal to the main scanning direction). Then, printing scan is performed. By repeating printing scan and stepped conveyance of the sheet, an image is printed on the sheet. The sheet where image printing is completed is cut by a cutter mechanism (not shown).

Control Apparatus

Figure 3:
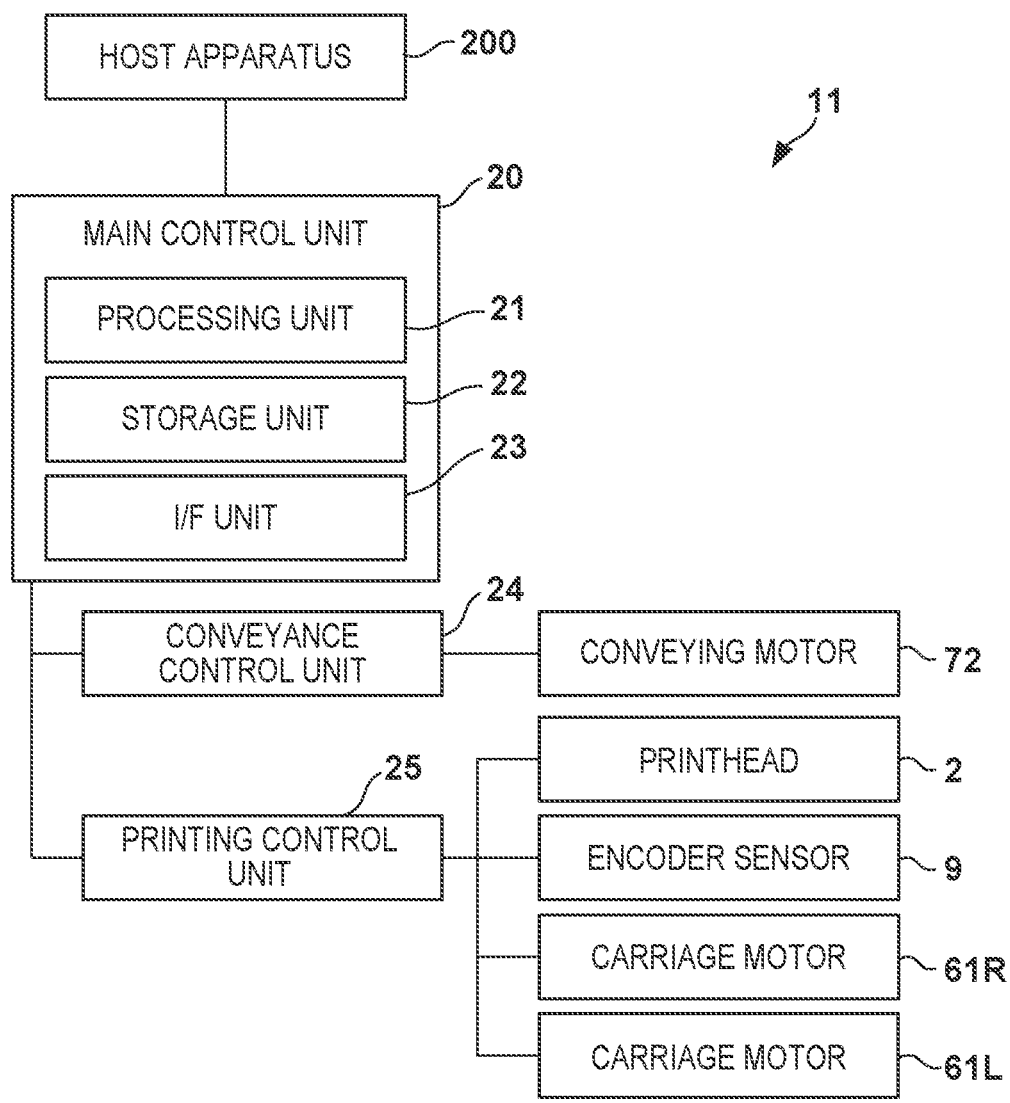
FIG. 3 is a block diagram of a control apparatus of the printing apparatus shown in FIG. 1.

With reference to FIG. 3, a control apparatus 11 of the printing apparatus 1 will be described. The control apparatus 11 is a circuit that includes at least one processor and at least one storage device, and the processor executes a program stored in the storage device. The control apparatus 11 according to this embodiment includes a main control unit 20, a conveyance control unit 24, and a printing control unit 25. The main control unit 20 receives image data and a printing instruction thereof from a host apparatus 200 and performs a printing operation.

The main control unit 20 includes a processing unit 21, a storage unit 22, and an interface unit (I/F unit) 23, and controls the entire printing apparatus 1. The processing unit 21 is a processor represented by a CPU, and executes a program stored in the storage unit 22. The storage unit 22 is a storage device such as a RAM or a ROM, and stores programs and data.

The conveyance control unit 24 and the printing control unit 25 perform conveyance control and printing control, respectively, by following instructions of the main control unit 20. For example, similar to the main control unit 20, each of the control units 24 and 25 includes a processing unit, a storage unit, and an I/F unit. A drive circuit for driving the motor and the like are also included.

The conveyance control unit 24 controls a conveying motor 72 that rotates the conveying roller 70 to perform conveyance control of the sheet. Note that a detection result of the sensor that detects the rotation amount of the conveying motor 72 and a detection result of the sensor that detects the conveyance position of the sheet (both sensors are not shown) are input to the conveyance control unit 24, and the conveyance control unit 24 controls the conveying motor 72 based on these detection results.

The printing control unit 25 performs driving control of the carriage motors 61R and 61L (movement control of the carriage 3) and driving control of the printhead 2 (ink discharge control) based on a detection result of the encoder sensor 9.

Movement Control of Carriage

Figure 4A:
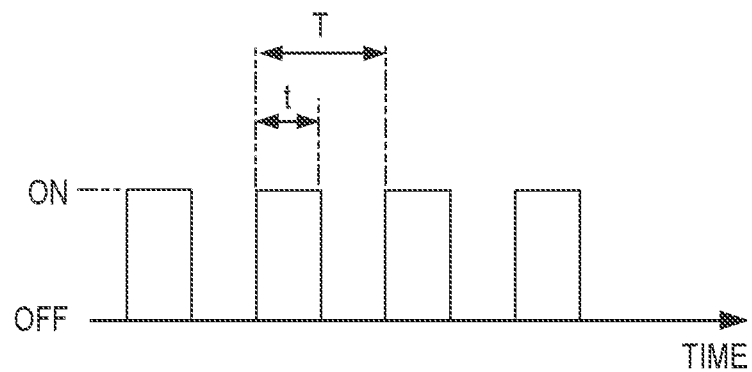
FIG. 4A is a view for explaining PWM control.

The carriage motors 61R and 61L are controlled independently. In this embodiment, driving control of the carriage motors 61R and 61L is PWM (Pulse Width Modulation) control. In PWM control, the output power is controlled by the ratio (duty ratio) of the energization time (ON time) per unit time. FIG. 4A is a view for explaining this. FIG. 4A shows an example in which ON time t per unit time T is 1/2T, and the duty ratio is 50%. As the duty ratio increases, the power supplied to each of the carriage motors 61R and 61L increases, and the output of each of the carriage motors 61R and 61L increases. The output of each of the carriage motors 61R and 61L is maximum when the duty ratio is 100%. Note that PWM control is employed as driving control of the carriage motors 61R and 61L in this embodiment, but another control method may be employed.

Figure 4B:
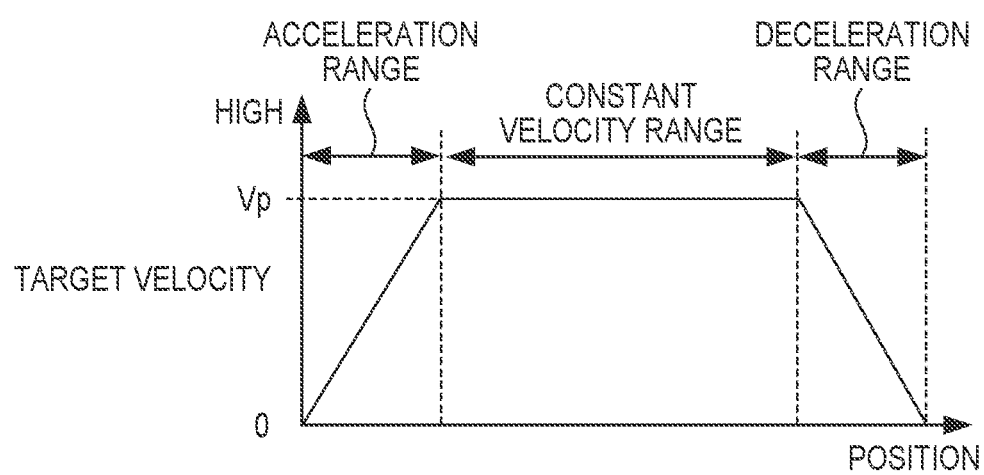
FIG. 4B is a graph showing the target velocity with respect to the position of a carriage.

The movement control of the carriage 3 in this embodiment is feedback control. At each of a large number of Y-direction positions of the carriage 3, a target velocity at the position is set in advance. FIG. 4B shows an example (velocity profile). The ordinate represents the target velocity of the carriage 3, and the abscissa represents the Y-direction position of the carriage 3.

The acceleration start position, the stop target position, and the deceleration start position of the carriage 3 are determined in advance. In this embodiment, the Y-direction positions of the carriage 3 are roughly classified into an acceleration range, a constant velocity range, and a deceleration range. The carriage 3 is accelerated to a printing velocity Vp, performs printing scan during the constant velocity range of the printing velocity Vp, and then is decelerated and stops. The target velocity for each position can be set such that the velocity and operation of the carriage 3 moderately change without a sharp change. The printing velocity Vp is changed in accordance with the printing efficiency and the printing quality. For example, when the printing efficiency is prioritized, the printing velocity Vp is set at a high velocity. When the printing quality is prioritized, the printing velocity Vp is set at a low velocity.

During the movement of the carriage 3, the printing control unit 25 calculates the actual position and actual velocity of the carriage 3 from the detection results of the encoder sensor 9. The printing control unit 25 increases or decreases the duty ratio in accordance with the difference between the target velocity at the actual position and the actual velocity. For example, if the actual velocity has not reached the target velocity, the duty ratio is increased. To the contrary, if the actual velocity exceeds the target velocity, the duty ratio is decreased.

Movement Mode of Carriage and Control Mode of Carriage Motor

The basic movement mode of the carriage 3 includes forward movement from a stop position (to be sometimes referred to as a home position (HP)) at the right end of the movement range to the left end and backward movement from a stop position at the left end of the movement range to the right end. The movement direction in the forward movement of the carriage 3 may be referred to as the forward direction, and the movement direction in the backward movement may be referred to as the backward direction.

Figure 5A:
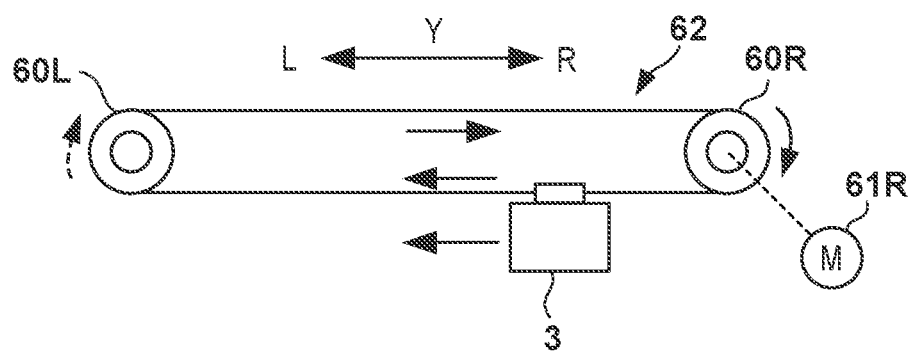
FIGS. 5A to 5C are views showing examples of control modes of carriage motors.
Figure 5B:
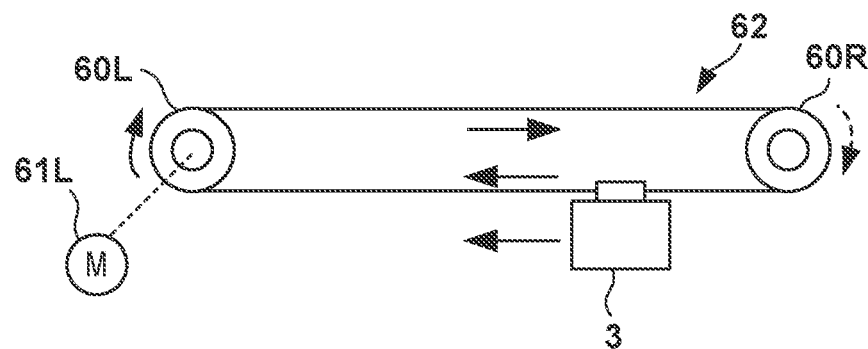
Figure 5C:
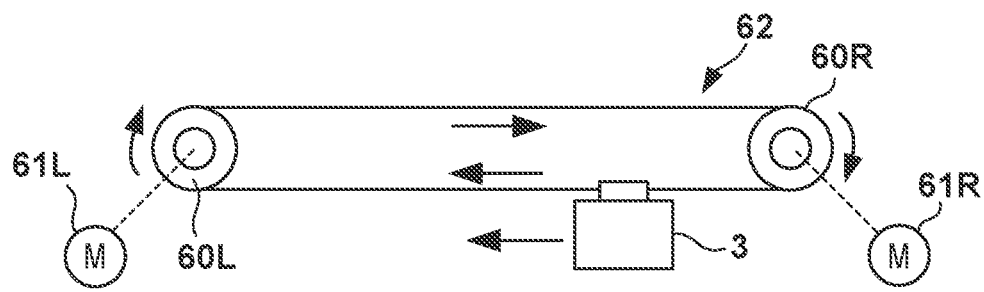

For the movement of the carriage 3 as described above, in this embodiment, it is possible to select, as the control mode of the carriage motors 61R and 61L, one control mode from a plurality of control modes. FIGS. 5A to 5C are views showing examples of the control modes of the carriage motors 61R and 61L. Among arrows each indicating the rotation direction of each of the pulleys 60R and 60L, a solid arrow indicates driving-rotation, and a broken arrow indicates driven-rotation.

The control mode shown in FIG. 5A is a control mode for moving the carriage 3 by the driving force of the carriage motor 61R alone (this is sometimes referred to as single driving). The carriage motor 61L is not driven. When the carriage motor 61R is rotated in one direction (defined as a forward direction), the pulley 60R is rotated clockwise as shown in FIG. 5A, and the carriage 3 can be moved in the forward direction. When the carriage motor 61R is rotated in a backward direction, the pulley 60R is rotated counterclockwise, and the carriage 3 can be moved in the backward direction.

The control mode shown in FIG. 5B is a control mode for moving the carriage 3 by the driving force of the carriage motor 61L alone (this is also one example of single driving). The carriage motor 61R is not driven. When the carriage motor 61L is rotated in one direction (defined as a forward direction), the pulley 60L is rotated clockwise as shown in FIG. 5B, and the carriage 3 can be moved in the forward direction. When the carriage motor 61L is rotated in a backward direction, the pulley 60L is rotated counterclockwise, and the carriage 3 can be moved in the backward direction.

The control mode shown in FIG. 5C is a control mode for moving the carriage 3 by the driving forces of both the carriage motors 61R and 61L (this is sometimes referred to as twin driving). When both the carriage motors 61R and 61L are rotated in the forward direction, the pulleys 60R and 60L are rotated clockwise as shown in FIG. 5C, and the carriage 3 moves in the forward direction. When the carriage motors 61R and 61L are rotated in a backward direction, the pulleys 60R and 60L are rotated counterclockwise, and the carriage 3 moves in the backward direction. In the control mode of driving both the carriage motors 61R and 61L, it is possible to obtain twice the torque obtained in the control mode of driving one of the carriage motors 61R and 61L. Accordingly, in the control mode shown in FIG. 5C, the carriage 3 can be moved at the highest velocity. In the control mode shown in each of FIGS. 5A and 5B, the moving velocity of the carriage 3 is lower than that in the control mode shown in FIG. 5C.

Adjustment of Control Amount

In twin driving, it is easy to apply the same control amount to the carriage motors 61R and 61L to drive them. However, an output difference can be generated between the carriage motors 61R and 61L due to an individual difference between them and the degree of deterioration thereof. Even if the carriage motors 61R and 61L are the same product, an output difference of about 10% can be generated. If the output difference is large, the movement of the carriage 3 becomes unstable, and the printing quality may be degraded. Particularly, at the time of switching the movement direction of the carriage 3 or when driving the carriage motors 61R and 61L with large outputs, the movement of the carriage 3 may become unstable.

Figure 7A:
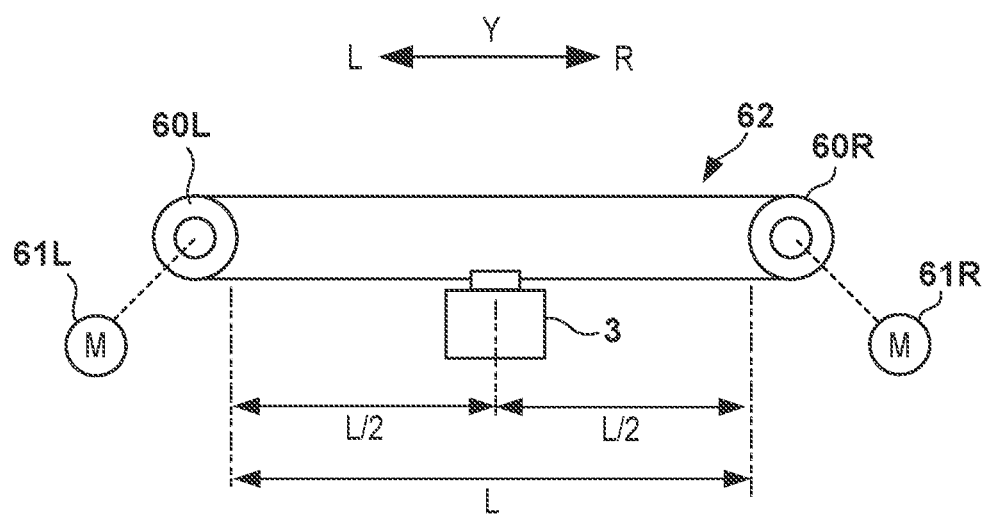
FIGS. 7A and 7B are views for explaining an operation of the carriage in the ratio information setting processing.
Figure 7B:
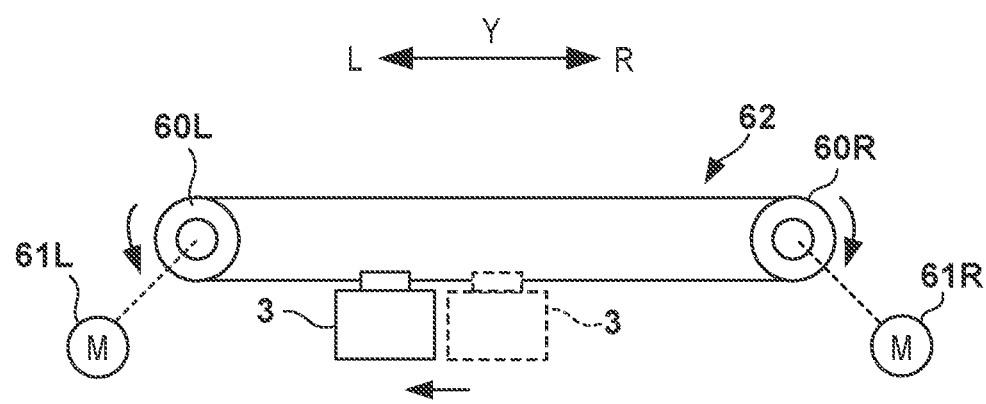

To prevent this, in twin driving, the control amounts of the carriage motors 61R and 61L are individually set so as to decrease the output difference between them. As a premise, the output difference between the carriage motors 61R and 61L is measured, and ratio information for adjusting the control amounts is set. FIG. 6 is a flowchart showing an example of processing performed by the printing control unit 25, and particularly, showing an example of ratio information setting processing. FIGS. 7A and 7B are views for explaining an operation of the carriage 3 in the ratio information setting processing.

Referring to FIG. 6, in step S1, the carriage 3 is moved to a predetermined position in the movement range. FIG. 7A exemplarily shows the mode in which the carriage 3 has moved to the predetermined position. In the example shown in FIG. 7A, the carriage 3 is positioned at the center of the movement range as the predetermined position. More specifically, the movement range of the carriage 3 is a section having a length L in the Y direction, and the carriage 3 is positioned at a position L/2 away from each end of the movement range.

Referring back to FIG. 6, after the carriage 3 is moved to the predetermined position, in step S2, the carriage motors 61R (R motor) and 61L (L motor) are driven with the same control amount but in opposite directions. For example, the duty ratio of PWM control of each of the carriage motors 61R and 61L is set to 50%. Then, the rotation direction of the carriage motor 61R is set to the direction for moving the carriage 3 in the forward direction, and the rotation direction of the carriage motor 61L is set to the direction for moving the carriage 3 in the backward direction.

In step S3, a detection result of the encoder sensor 9 is obtained to determine whether the carriage 3 is moving. If there is an output difference (torque difference here) between the carriage motors 61R and 61L driven with the same control amount, the carriage 3 moves in the forward direction or the backward direction. If it is determined that the carriage 3 is moving, the process advances to step S4. If it is determined that the carriage 3 stops, the process advances to step S5. In the movement determination, determination may be made based on whether the number of encoder pulses per unit time is equal to or larger than a threshold value (moving) or smaller than the threshold (stop).

In step S4, the control amount of at least one of the carriage motors 61R and 61L is adjusted so as to cause the carriage 3 to stop. For example, assume that the duty ratio of each of the carriage motors 61R and 61L is set to 50% in step S2. Further, assume that the rotation direction of the carriage motor 61R is set to the direction for moving the carriage 3 in the forward direction, and the rotation direction of the carriage motor 61L is set to the direction for moving the carriage 3 in the backward direction. If it is detected in step S3 that the carriage 3 is moving in the forward direction, the outputs of the carriage motors 61R and 61L have a relationship expressed by carriage motor 61R>carriage motor 61L. FIG. 7B exemplarily shows the movement mode of the carriage 3 in a case of the relationship expressed by carriage motor 61R>carriage motor 61L.

Therefore, in the processing in step S4, the duty ratio of the carriage motor 61L is increased to 60%. Alternatively, the duty ratio of the carriage motor 61R is decreased to 40%. Alternatively, the duty ratio of the carriage motor 61L is increased to 55% and the duty ratio of the carriage motor 61R is decreased to 45%. With this operation, the carriage 3 can be stopped.

In step S5, the control amount of each of the carriage motors 61R and 61L is stored. For example, if the duty ratio of the carriage motor 61R and the duty ratio of the carriage motor 61L to stop the movement of the carriage 3 are 45% and 55%, respectively, these duty ratios are stored. The storage destination is, for example, a storage device of the printing control unit 25. In step S6, the carriage 3 is moved to a home position, and driving of each of the carriage motors 61R and 61L is stopped.

In step S7, ratio information is set. The ratio information is set based on the ratio between the control amounts stored in step S5. For example, if the control amounts stored in step S5 indicate 45% for the carriage motor 61R and 55% for the carriage motor 61L, the ratio information is set as carriage motor 61R:61L=45:55. The ratio indicated by the ratio information corresponds to the inverse ratio of the output ratio between the carriage motors 61R and 61L for the same control amount. In the actual movement control of the carriage 3, by adjusting the respective control amounts of the carriage motors 61R and 61L based on the ratio information, the output difference between them can be decreased. The ratio information is stored in, for example, the storage device of the printing control unit 25.

Note that in the example shown in FIG. 6, the carriage 3 is positioned at the center of the movement range in step S2, but the carriage 3 may be positioned at an arbitrary position. However, when the carriage 3 is positioned at the center of the movement range, the influence of expansion/contraction of the timing belt 62 on the lateral movement of the carriage 3 can be reduced.

The timing of performing the processing shown in FIG. 6 can be during an initialization process at the time of activation (power-on) of the printing apparatus 1. Further, this processing can be performed when the number of printed sheets in the printing apparatus 1 has reached a predetermined number, when the number of printing operations has reached a predetermined number, or when the total operation time of the carriage 3 has reached a predetermined time. Furthermore, this processing can be performed when at least one of the carriage motors 61R and 61L is replaced during maintenance. By performing the processing shown in FIG. 6 at one of the above-described timings to update the ratio information to the latest information, the output difference between the carriage motors 61R and 61L can be decreased in twin driving.

Figure 8:
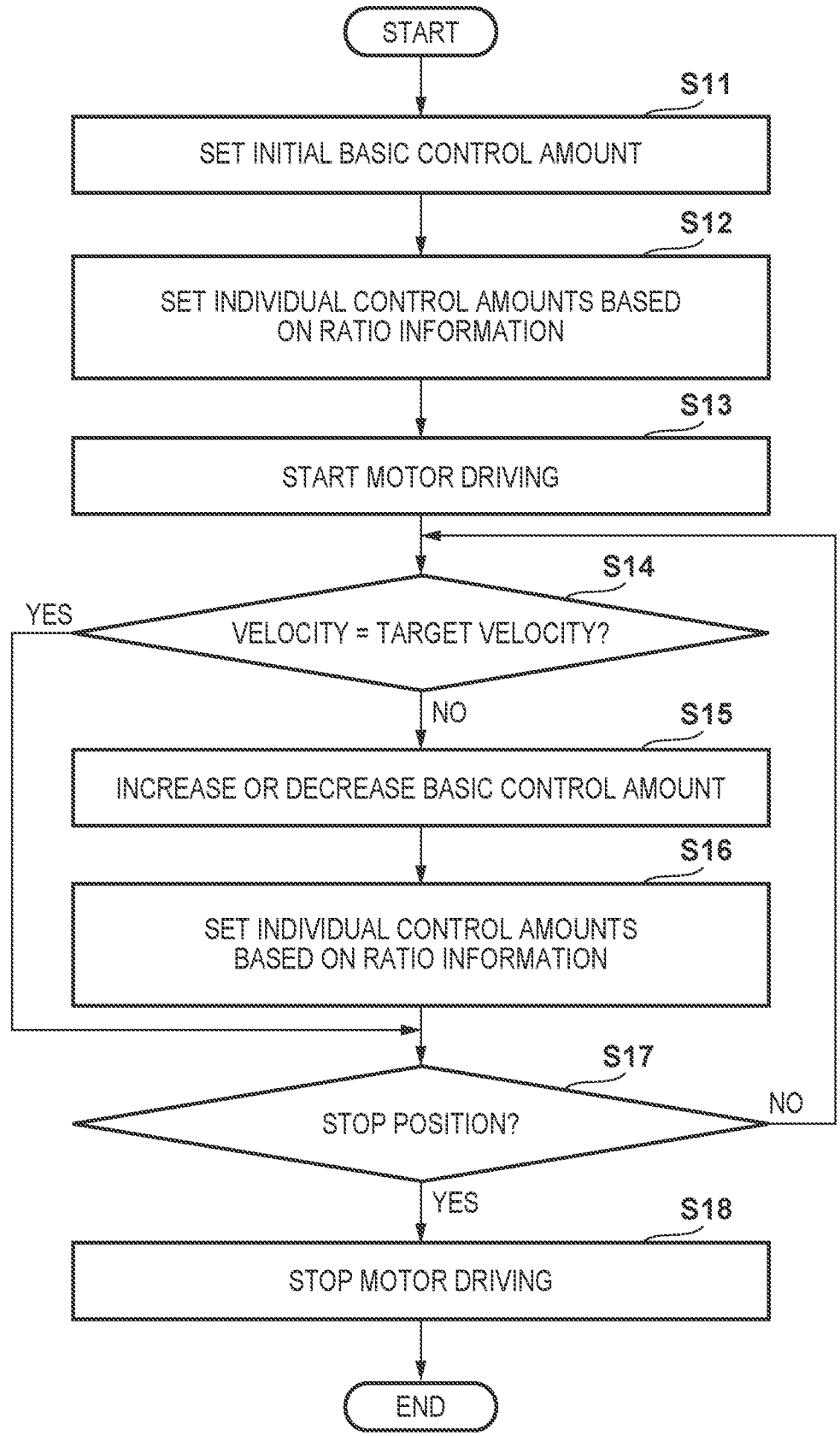
FIG. 8 is a flowchart showing a control example of the carriage motors.

FIG. 8 is a flowchart showing an example of processing performed by the printing control unit 25, and particularly, showing an example of processing related to adjustment of the control amounts of the carriage motors 61R and 61L in twin driving in the actual printing operation.

In step S11, an initial basic control amount is set. The basic control amount is the control amount before adjustment, and the initial basic control amount is the control amount at the start of movement of the carriage 3. In step S12, the ratio information is read out, and the individual control amounts of the carriage motors 61R and 61L are set. For example, assume that the initial basic control amount set in step S11 is a duty ratio of 70% and the ratio information is set as carriage motors 61R:61L=45:55. The duty ratio of the carriage motor 61R as the individual control amount is calculated as the duty ratio =2×70%×(45%/(45%+55%)=63%. The duty ratio of the carriage motor 61L as the individual control amount is calculated as the duty ratio =2×70%×(55%/(45% +55%)=77%. With this, the output difference between the carriage motors 61R and 61L can be decreased.

In step S13, driving of each of the carriage motors 61R and 61L is started. After this, the movement control described with reference to FIG. 4B is performed. That is, in step S14, the actual position and actual velocity of the carriage 3 are calculated from detection results of the encoder sensor 9, and it is determined whether the actual velocity matches the target velocity at the actual position. If they match, the process advances to step S17. If there is a difference between the actual velocity and the target velocity, the process advances to step S15 and the basic control is increased or decreased in accordance with the difference. For example, if the actual velocity has not reached the target velocity, the basic control amount is increased. To the contrary, if the actual velocity exceeds the target velocity, the basic control amount is decreased. In step S16, the ratio information is read out, and the individual control amounts of the carriage motors 61R and 61L are set based on the basic control amount calculated in step S15. The method for this is similar to the method described in the processing in step S12. With this, the output difference between the carriage motors 61R and 61L can be decreased.

In step S17, it is determined whether the carriage 3 has reached the stop position. If the carriage 3 has reached the stop position, the process advances to step S18; otherwise, the process returns to step S14. In step S18, driving of each of the carriage motors 61R and 61L is stopped.

As has been described above, according to this embodiment, by decreasing the output difference between the carriage motors 61R and 61L in twin driving, the carriage 3 can be moved more stably. Note that in the processing in each of steps S12 and S16 of FIG. 8, the individual control amounts are calculated each time with respect to the basic control amount. However, the individual control amount with respect to the basic control amount may be tabulated in advance, and the individual control amount may be read out from the table. More specifically, when the ratio information is set, the individual control amounts of the carriage motors 61R and 61L in the entire range of the basic control amount are calculated and tabulated. Then, for example, in each of steps S12 and S16, the individual control amount corresponding to the basic control amount may be read out and set.

In this embodiment, it is assumed that the same product is used as the carriage motors 61R and 61L, but different products can be also used. Also in this case, the method according to this embodiment is applicable and the output difference between the two motors can be decreased in twin driving.

Second Embodiment

Figure 9:
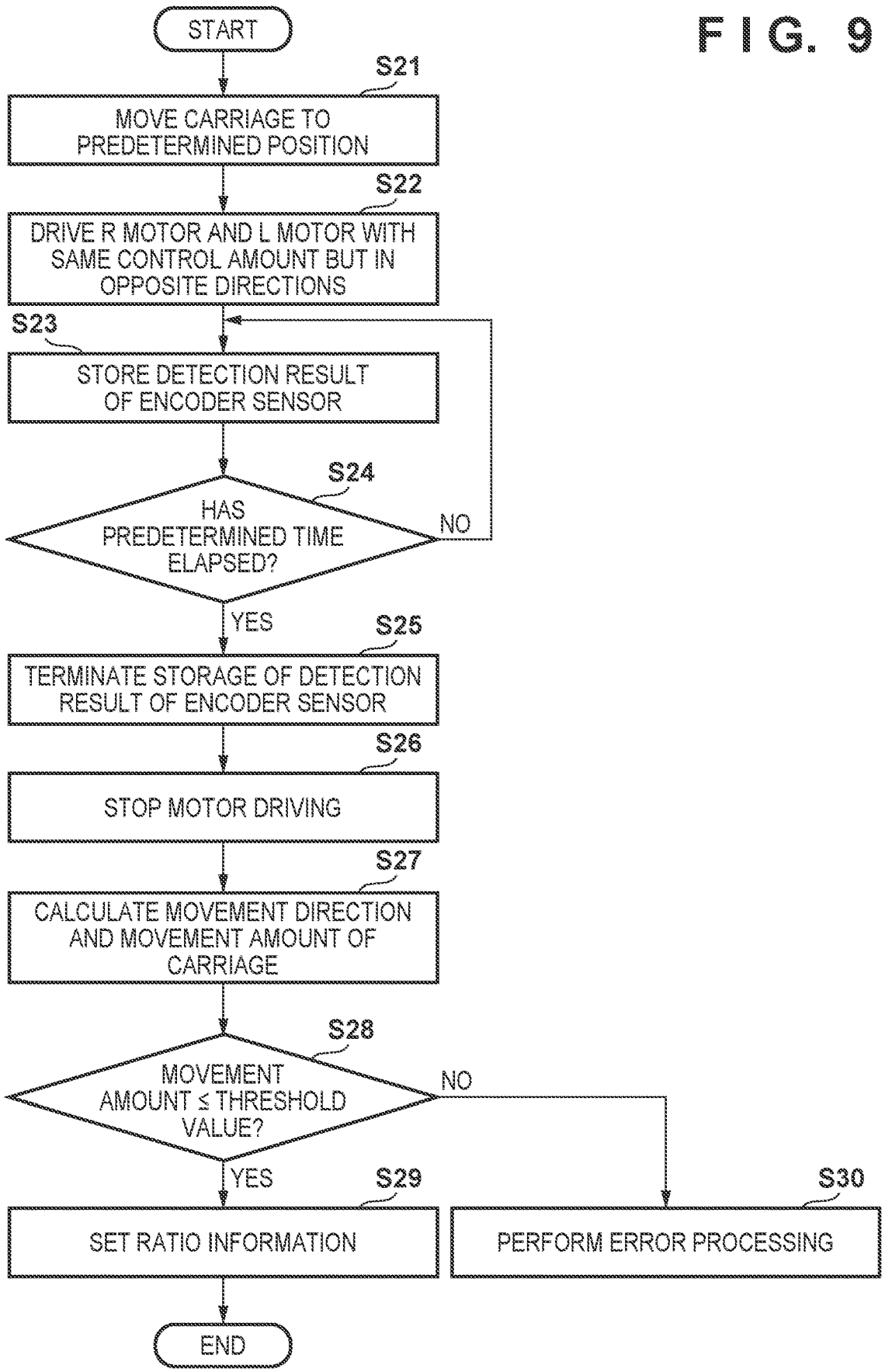
FIG. 9 is a flowchart showing another example of the ratio information setting processing.

In the processing shown in FIG. 6 according to the first embodiment, the carriage motors 61R and 61L are controlled so as to stop the carriage 3, and the output difference is specified from the difference between the control amounts of the motors. However, the control amounts may be set equal to each other, and the output difference may be specified from the movement amount of a carriage 3. FIG. 9 is a flowchart showing an example of this, and showing processing alternative to the processing example shown in FIG. 6.

In step S21, the carriage 3 is moved to a predetermined position in the movement range. Also in this embodiment, as exemplarily shown in FIG. 7A, the carriage 3 is positioned at the center of the movement range as the predetermined position. The influence of expansion/contraction of a timing belt 62 on the lateral movement of the carriage 3 can be reduced. However, the predetermined position may be an arbitrary position.

In step S22, carriage motors 61R (R motor) and 61L (L motor) are driven with the same control amount but in opposite directions. This processing is similar to that in step S2 of FIG. 6. In step S23, in order to specify the movement direction and movement amount of the carriage 3 later, detection results of an encoder sensor 9 are sequentially stored. The storage destination is, for example, a storage device of a printing control unit 25.

In step S24, it is determined whether a predetermined measurement time (for example, several sec to ten-odd sec) has elapsed after the start of driving in step S22. If the measurement time has elapsed, the process advances to step S25. In step S25, storage of the detection results of the encoder sensor 9 is terminated. In step S26, the carriage 3 is moved to a home position, and driving of each of the carriage motors 61R and 61L is stopped.

The detection results stored in step S23 are the detection results of the encoder sensor 9 obtained when the carriage motors 61R and 61L are driven for the predetermined time. In step S27, the detection results of the encoder sensor 9 stored by the processing in step S23 are read out, and the movement direction (forward direction or backward direction) and movement amount of the carriage 3 in the measurement time are calculated. In step S28, it is determined whether the movement amount calculated in step S27 is equal to or smaller than a threshold value. If the movement amount is equal to or smaller than the threshold value, the process advances to step S29. If the movement amount exceeds the threshold value, the process advances to step S30.

In step S29, ratio information is set. As the ratio information, the strengths of the outputs of the carriage motors 61R and 61L are specified from the movement direction of the carriage 3, and the ratio between the control amounts is specified from the movement amount of the carriage 3. For example, assume that, in step S22, the rotation direction of the carriage motor 61R is set to the direction for moving the carriage 3 in the forward direction, and the rotation direction of the carriage motor 61L is set to the direction for moving the carriage 3 in the backward direction.

If it is detected that the carriage 3 is moving in the forward direction, the outputs of the carriage motors 61R and 61L have a relationship expressed by carriage motor 61R>carriage motor 61L. Therefore, the ratio information is set so as to decrease the output of the carriage motor 61R and increase the output of the carriage motor 61L.

The ratio may be calculated as described below. For example, if movement amount×coefficient=rate of change and a reference value is 50%, the control amount of the carriage motor 61R may be calculated by 50%−the rate of change, and the control amount of the carriage motor 61L may be calculated by 50%+the rate of change. Alternatively, the rate of change may be added to or subtracted from only one of the control amounts of the carriage motors 61R and 61L. If the movement amount is small, the rate of change may be set to 0. By setting the ratio information as described above, in the processing shown in FIG. 9 in the second embodiment, as in the first embodiment, twin driving can be performed while decreasing the output difference between the carriage motors 61R and 61L.

In step S30, it is considered that the output difference between the carriage motors 61R and 61L is too large and abnormal, and error processing is performed. Here, for example, a user is notified that maintenance of the motor is required. In this case, a notification may be given which prompts the user to replace the carriage motor having a low output.

Third Embodiment

It is desirable that the degree of tension of a timing belt 62 is maintained appropriately in terms of the high-velocity movement and positional accuracy of a carriage 3. An example of processing related to the degree of tension of the timing belt 62 and the like will be described below.

Figure 10:
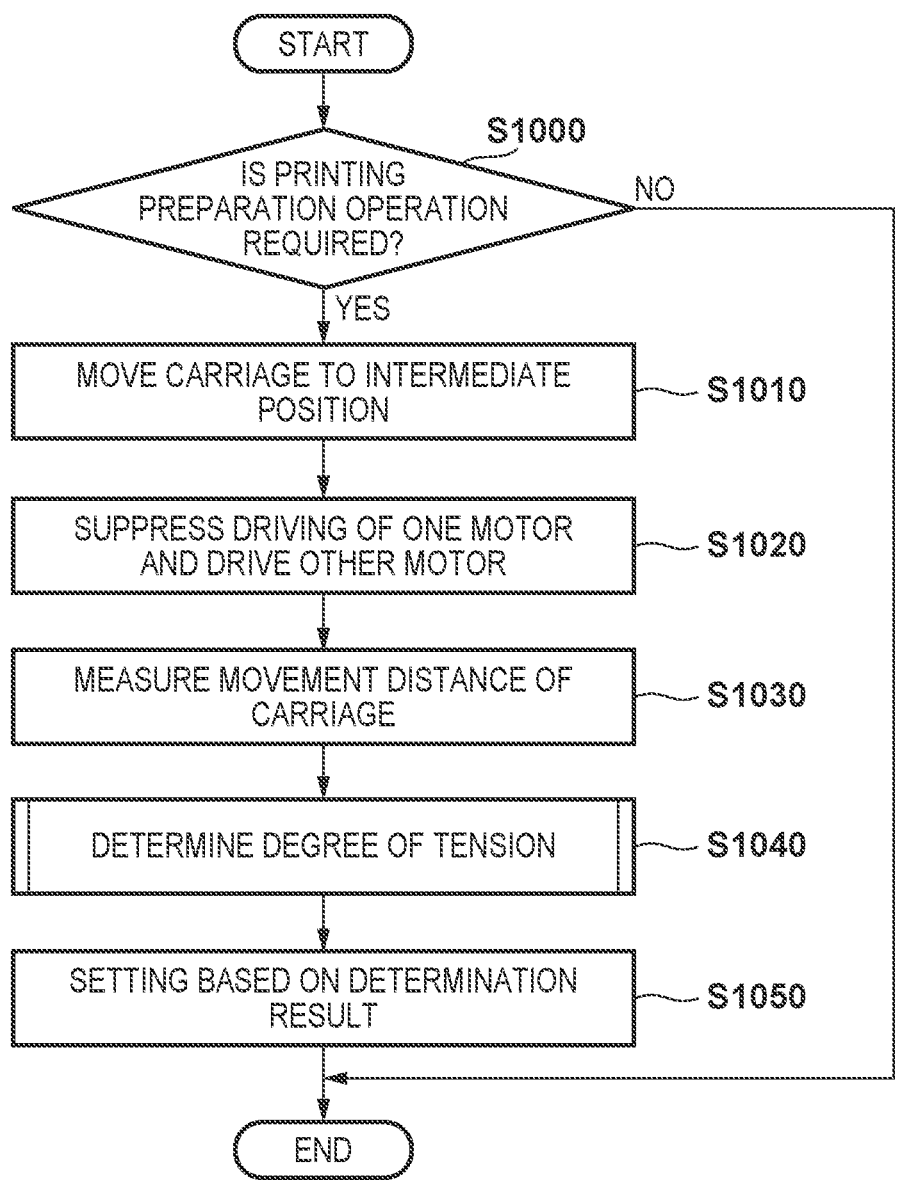
FIG. 10 is a flowchart showing an example of a method of determining the degree of tension of a timing belt.

FIG. 10 is a flowchart illustrating a method of determining the degree of tension of the timing belt 62. The contents of this flowchart are executed by, for example, a printing control unit 25. The outline of the contents is that carriage motors 61R and 61L are individually driven and the movement amount of the carriage 3 caused by the expansion/contraction of the timing belt 62 is measured, thereby equivalently evaluating or detecting the tension of the timing belt 62. From this viewpoint, the above-described determination may be expressed as evaluation, detection, or the like, and the printing control unit 25 may be expressed as a determination unit, an evaluation unit, a detection unit, or the like.

The criteria for the above-described determination can be changed depending on whether the timing belt 62 is formed of an expandable/contractable material such as rubber, a flexible material such as a resin, or a relatively rigid material such as aluminum or steel.

In step S1000 (this is to be simply referred to as "S1000" hereinafter; the same applies to other steps described later), it is determined whether a printing preparation operation such as calibration is required. If the printing preparation operation is required, the process advances to S1010; otherwise, the processing of this flowchart is terminated.

In S1010, the carriage motor 61R or 61L is driven to move the carriage 3 so as to position it between the carriage motors 61R and 61L. Although the details will be described later, in this embodiment, the carriage 3 is conveyed to an intermediate position between the carriage motors 61R and 61L (for example, a position where the difference between the distance from the carriage motor 61R and the distance from the carriage motor 61L falls within±10%). For example, when the carriage 3 is closer to the motor 61R among the carriage motors 61R and 61L, the motor 61L is driven to move the carriage 3 to the motor 61L side while suppressing driving of the motor 61R (while maintaining the motor 61R in an idling state). Alternatively, for example, when the carriage 3 is closer to the motor 61L among the carriage motors 61R and 61L, the motor 61R is driven to move the carriage 3 to the motor 61R side while suppressing driving of the motor 61L (while maintaining the motor 61L in an idling state). With this operation, the carriage 3 can be moved while eliminating bending of the timing belt 62.

Figure 11A:
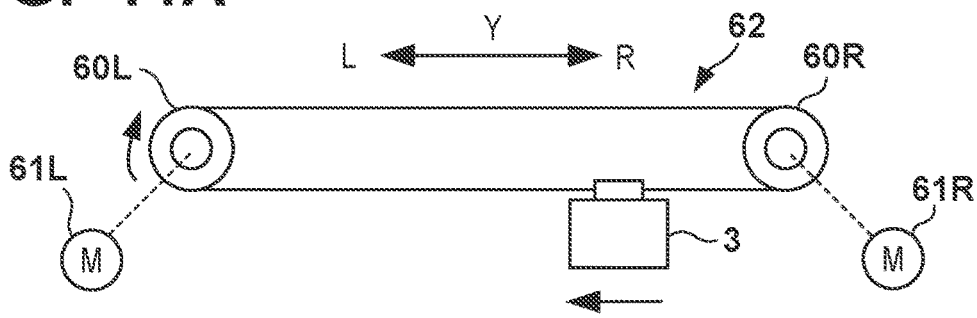
FIGS. 11A to 11D are schematic views showing an example of a driving mode.
Figure 11B:
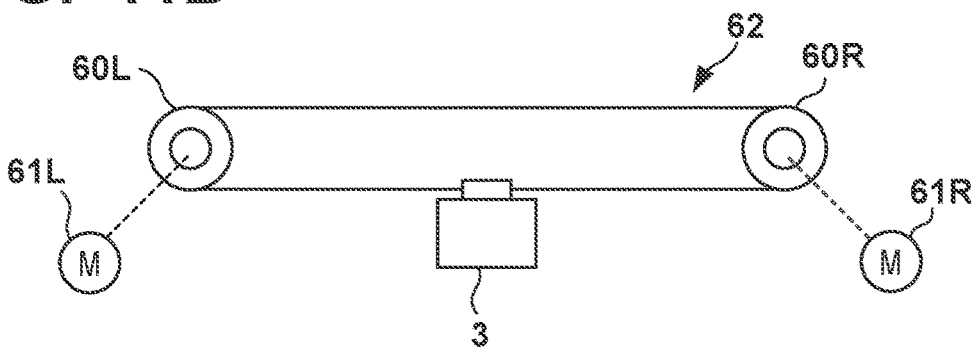

FIGS. 11A and 11B are schematic views showing the states in S1010. In this example, as shown in FIG. 11A, the carriage 3 is located closer to the carriage motor 61R than the carriage motor 61L. Therefore, the carriage motor 61L is driven to move the carriage 3 to the carriage motor 61L side while suppressing driving of the carriage motor 61R. With this, as shown in FIG. 11B, the carriage 3 can be moved to an intermediate position between the carriage motors 61R and 61L.

In S1020, while suppressing driving of one (for example, 61R) of the carriage motors 61R and 61L (while maintaining the carriage motor 61R in a braking state), the other one (for example, 61L) is driven to move the carriage 3 to the side of the other one (for example, 61L).

Figure 11C:
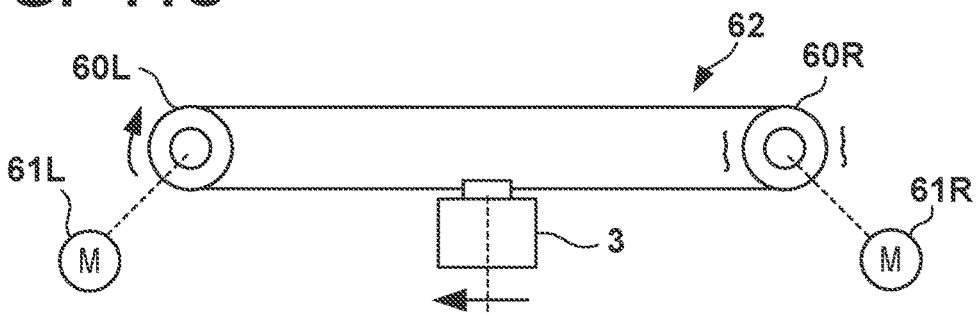
Figure 11D:
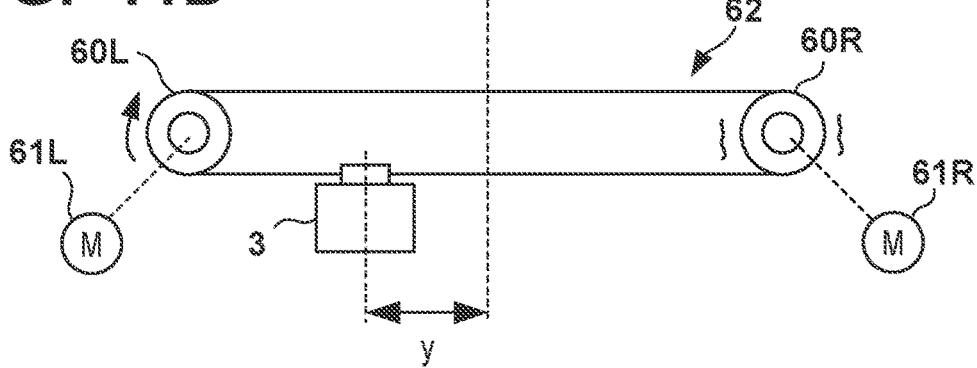

FIGS. 11C and 11D are schematic views showing the states in S1020. In this embodiment, as shown in FIG. 11C, the carriage motor 61L is driven to move the carriage 3 to the carriage motor 61L side while suppressing driving of the carriage motor 61R. With this, as shown in FIG. 11D, the carriage 3 can be moved to the carriage motor 61L side by a distance y corresponding to the tension of the timing belt 62.

In S1030, the distance moved by the carriage 3 in S1020 is measured based on a detection result of an encoder sensor 9. In S1040, based on the measurement result (the movement distance of the carriage 3) in S1030, the degree of tension of the timing belt 62 is determined. For example, if the measurement result falls within a reference range, it can be determined that reciprocating movement of the carriage 3 can be implemented under appropriate tension of the timing belt 62. Otherwise, for example, if the measurement result falls outside the reference range, it can be determined that the accuracy of movement of the carriage 3 can decrease. Particularly, if the measurement result falls outside an allowable range, it can be determined that maintenance of the printing apparatus 1 is required.

In this embodiment, the above-described measurement result (the movement distance of the carriage 3) can be determined as one of the following results:
 (a) the measurement result falls within the reference range;
 (b) the measurement result falls above the reference range (the upper limit value thereof);
 (c) the measurement result falls below the reference range (the lower limit value thereof); and
 (d) the measurement result falls outside an allowable range.

Note that since the carriage 3 is positioned in a substantially central portion between the carriage motors 61R and 61L in S1010 prior to S1040, the relatively large movement distance of the carriage 3 can be measured in S1030. Thus, in S1040, it is possible to determine the degree of tension of the timing belt 62 with higher accuracy.

In S1050, based on the determination result in S1040, the setting of the driving mode of each of the carriage motors 61R and 61L is maintained, the setting is changed or adjusted, or a predetermined notification is given.

In a case of (a) described above, it is considered that the traveling mode of the timing belt 62 is appropriate, so that the accuracy of movement of the carriage 3 is maintained and it is notified that printing can be continued. Therefore, in this case, the setting of the driving mode of each of the carriage motors 61R and 61L is maintained.

In a case of (b) described above, it is notified that the tension of the timing belt 62 is lower than the reference. In this case, for example, the tension of the timing belt 62 can be set to fall within the reference range by adjusting the driving mode of one or both of the carriage motors 61R and 61L. With this, scanning of the carriage 3 can be implemented with a desired accuracy. Therefore, in this case, the setting of the driving mode of each of the carriage motors 61R and 61L is changed such that the tension of the timing belt 62 falls within the reference range.

As an example, the driving mode of the carriage motor 61R and/or 61L can be adjusted such that the acceleration during the reciprocating movement of the carriage 3 satisfies a reference corresponding to the above-described determination result. As another example, the driving mode of the carriage motor 61R and/or 61L can be adjusted such that the velocity (for example, the upper limit value and/or the lower limit value) during the reciprocating movement of the carriage 3 satisfies a reference corresponding to the above-described determination result. Alternatively, the driving mode of the motor 61R and/or 61L may be adjusted such that the tension of the belt 62 becomes the tension with which the bending of the belt 62 is not transmitted to the carriage 3 and the vibrations of the motors 61R and 61L are not transmitted to the carriage 3 via the belt 62. Therefore, for example, the control parameters of the carriage motor 61R and/or 61L may be changed in accordance with the determination result.

In a case of (c) described above, it can be said that the tension of the timing belt 62 is higher than the reference. However, if the carriage motors 61R and 61L are individually driven to decrease the tension and the driving forces thereof are kept constant, the tension becomes lower than the tension over time. Therefore, in this case, it is notified that even if the tension of the timing belt 62 temporarily falls within the reference range, it is difficult to continuously keep the tension within the reference range and constant. Accordingly, in this case, it is considered that maintenance of the printing apparatus 1 is required, and a predetermined notification is given to the user.

In a case of (d) described above, since the tension of the timing belt 62 is too high or too low, it is notified that it is difficult to make the tension of the timing belt 62 fall within the reference range even by individually adjusting the driving modes of the carriage motors 61R and 61L. Therefore, in this case, it is considered that maintenance of the printing apparatus 1 is required, and a predetermined notification is given to the user.

In the example shown in FIG. 10, a mode has been exemplarily shown in which the carriage motor 61L is driven to move the carriage 3 to the carriage motor 61L side while suppressing driving of the carriage motor 61R in S1010 to S1040, and a determination is made based on the movement distance of the carriage 3 at this time. However, since the carriage motors 61R and 61L can be individually driven, a change as described below may be added.

FIG. 12 is a flowchart showing another method of determining the degree of tension of the timing belt 62.

In S1110, in the procedure similar to that in S1010, the carriage motor 61R or 61L is driven to move the carriage 3 so as to position it between the carriage motors 61R and 61L.

In S1120, the carriage motor 61R is driven to move the carriage 3 to the carriage motor 61R side while suppressing driving of the carriage motor 61L.

In S1130, the distance moved by the carriage 3 in S1120 is measured based on a detection result of the encoder sensor 9.

In S1040, the degree of tension of the timing belt 62 is determined by a determination unit (processing unit 21) based on the measurement results (the movement distances of the carriage 3) in S1030 and S1130. Here, the measurement result in S1030 indicates the distance (first distance) moved by the carriage 3 to the carriage motor 61L side, and the measurement result in S1130 indicates the distance (second distance) moved by the carriage 3 to the carriage motor 61R side. The above-described determination can be made based on a calculated value (for example, an added value, an average value, or the like) of the measurement results. Accordingly, it is possible to further increase the accuracy of the above-described determination.

FIG. 13 is a graph showing a relationship between the movement distance of the carriage 3 and the tension of the timing belt 62 in this embodiment. In FIG. 13, the abscissa represents the movement distance y [mm (millimeter)] of the carriage 3, and the ordinate represents a tension T [kgf (kilogram force)] of the timing belt 62.

For example, if the tension T satisfies $3<T<5$ (if $1.0<y<2.6$), this corresponds to the case of (a) described above. In this case, the highly accurate movement of the carriage 3 can be kept. If the tension T satisfies $2<T<3$ (if $2.6<y<4.4$), this corresponds to the case of (b) described above. In this case, the highly accurate movement of the carriage 3 can be kept by individually driving the carriage motors 61R and 61L so as to make the tension T satisfy $3<T<5$. Note that a case of $T=3$ may be included in either of the above-described two cases.

As has been described above, if the tension of the timing belt 62 falls outside the reference range, the accuracy of movement of the carriage 3 may decrease. To prevent this, in this embodiment, the degree of tension of the timing belt 62 is determined and, based on the result of the determination, the carriage motors 61R and 61L can be individually driven so as to make the tension of the timing belt 62 fall within the reference range. Therefore, according to this embodiment, increasing the accuracy of movement of the carriage 3 can be implemented relatively easily.

Other Embodiments

Carriage motors 61R and 61L are not limited to DC brushless motors, and motors of another type may be used.

Embodiment(s) of the present invention can also be realized by a computer of a system or apparatus that reads out and executes computer executable instructions (e.g., one or more programs) recorded on a storage medium (which may also be referred to more fully as anon-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Pat. Application No. 2021-082601, filed May 14, 2021, which is hereby incorporated by reference herein in its entirety.

What is claimed is:

1. A printing apparatus comprising:
a carriage mounted with a printing unit configured to perform printing on a print medium;
a first motor used to move the carriage;
a second motor used together with the first motor to move the carriage; and
a control unit configured to control the first motor and the second motor,
wherein when moving the carriage, the control unit controls the first motor with a first control amount and controls the second motor with a second control amount,
the first control amount and the second control amount are different from each other, and a ratio therebetween is a predetermined ratio, and
the predetermined ratio is set so that an output difference between the first motor and the second motor is less than that in a case in which the first control amount and the second control amount are the same control amount.

2. The apparatus according to claim 1, wherein
the predetermined ratio corresponds to an inverse ratio of an output ratio between the first motor and the second motor for the same control amount.

3. The apparatus according to claim 1, further comprising:
a detection unit configured to detect movement of the carriage,
wherein the control unit performs setting processing in which the predetermined ratio is set, and
in the setting processing, the first motor and the second motor are driven in opposite directions and, based on the control amount of the first motor and the control amount of the second motor at the time when the detection unit detects that the carriage is stopped, the predetermined ratio is set.

4. The apparatus according to claim 3, wherein
in the setting processing, the first motor and the second motor are driven after the carriage is positioned at the center of a movement range of the carriage.

5. The apparatus according to claim 1, further comprising:
a detection unit configured to detect a movement amount of the carriage,
wherein the control unit performs setting processing of setting the predetermined ratio, and
in the setting processing, the predetermined ratio is set based on the movement amount of the carriage detected by the detection unit at the time when the first motor and the second motor are driven with the same control amount for a predetermined time but in opposite directions.

6. The apparatus according to claim 5, wherein
based on the movement amount of the carriage detected by the detection unit in the setting processing, the control unit determines an abnormality of one of the first motor and the second motor.

7. The apparatus according to claim 5, wherein
in the setting processing, the first motor and the second motor are driven after the carriage is positioned at the center of a movement range of the carriage.

8. The apparatus according to claim 1, wherein
the control unit drives the first motor and the second motor by PWM control, and
each of the first and second control amounts corresponds to a duty ratio.

9. The apparatus according to claim 1, further comprising:
a driving unit configured to move the carriage while using the first motor and the second motor as driving sources,
wherein the driving unit includes:
a plurality of rotation members, and
an endless belt wound around the plurality of rotation members and connected with the carriage,
the first motor is the driving source configured to rotate a first rotation member included in the plurality of rotation members, and
the second motor is the driving source configured to rotate a second rotation member included in the plurality of rotation members.

10. A carriage apparatus comprising:
a carriage mounted with a printing unit configured to perform printing on a print medium;
a first motor used to move the carriage;
a second motor used together with the first motor to move the carriage; and
a control unit configured to control the first motor and the second motor,
wherein when moving the carriage, the control unit controls the first motor with a first control amount and controls the second motor with a second control amount,
the first control amount and the second control amount are different from each other, and a ratio therebetween is a predetermined ratio, and
the predetermined ratio is set so that an output difference between the first motor and the second motor is less than that in a case in which the first control amount and the second control amount are the same control amount.

11. A control method of a printing apparatus including a carriage mounted with a printing unit configured to perform printing on a print medium, a first motor used to move the carriage, and a second motor used together with the first motor to move the carriage, the method comprising:
when moving the carriage, controlling the first motor with a first control amount and the second motor with a second control amount,
wherein the first control amount and the second control amount are different from each other, and a ratio therebetween is a predetermined ratio, and
the predetermined ratio is set so that an output difference between the first motor and the second motor is less than that in a case in which the first control amount and the second control amount are the same control amount.

* * * * *